Patented Mar. 19, 1940

2,194,419

UNITED STATES PATENT OFFICE 2,194,419

CYCLIC AMIDINES AND PROCESS OF PRODUCING THEM

August Chwala, Vienna, Germany, assignor to I. G. Farbenindustrie Aktiengesellschaft, Frankfort-on-the-Main, Germany No Drawing. Application June 29, 1938, Serial No. 216,473. In Austria July 7, 1937

18 Claims. (Cl. 260—309)

The present invention relates to organic compounds containing nitrogen and it especially relates to cyclic amidines and a process of preparing them. It is an object of the present invention to react diamino compounds with carboxylic acids and especially with di- and polycarboxylic acids so that reaction products containing two or more cyclic amidine radicals are obtained. A further object of the present invention is the manufacture of quaternary ammonium compounds corresponding with the cyclic amidines. The cyclic amidines and their quaternary ammonium compounds may be used by virtue of their capillary activity for many industrial purposes.

I have found that compounds containing in the molecule two or more cyclic acid amidine radicals which are connected by organic radicals bound to the $\mu$-position of the cyclic radicals, the ring comprising the amidine group having but one double bond, such as imidazolines and tetrahydropyrimidines, may be prepared by heating at an elevated temperature, preferably at a temperature above 200° C., a di- or poly-basic carboxylic acid, the carbon chain of which may be interrupted by nitrogen, sulfur or oxygen, or a derivative thereof with a mixture of primary or secondary 1.2- or 1.3-diamines and salts of the said amines with strong acids. By $\mu$-position the nuclear carbon atom is designated which stands between the two nitrogen atoms.

Suitable acids are aliphatic dibasic acids, such as malonic acid, succinic acid and the higher homologues and substitution products, such as adipic acid, beta-methyl-adipic acid, sebacic acid, alkyl-malonic acids, malic acid, tartaric acid and the derivatives of the two last-mentioned acids obtained by etherification of the alcoholic hydroxyl group, further unsaturated acids, such as maleic acid, hydromuconic acid; aliphatic tri- and tetra-basic acids, such as tri-carballylic acid, aconitic acid, citric acid, alpha-, gamma-, delta-pentane-tricarboxylic acid, alkylene-dimalonic acids, trimethylene-disuccinic acid; aromatic and hydroaromatic di- and polybasic carboxylic acids, such as terephthalic acid, 4-methyl-terephthalic acid, 5-hydroxy-isophthalic acid, ortho-phenylene-diacetic acid, trimesitic acid, pyro-mellitic acid, naphthalic acid, camphoric acid, lutidinic acid; further poly-basic acids, the carboxylic acid groups of which are attached to a carbon chain interrupted by oxygen, sulfur or nitrogen, for instance, diglycollic acid $$O(CH_2CO_2H)_2$$

hydroquinone-diglycol ether acid $$p—C_6H_4(OCH_2CO_2H)_2$$

thiodiglycollic acid $S(CH_2CO_2H)_2$, para-toluene-sulfimino-diacetic acid, $$para-CH_3C_6H_4SO_2N(CH_2CO_2H)_2$$

and the like.

As 1.2-diamines there may, for instance, be used: ethylene-diamine, N-methyl-ethylene-diamine, N.N'-dibenzyl-ethylene-diamine, propylene-diamine, ortho-cyclo-hexylene-diamine, diphenyl-ethylene-diamine $$C_6H_5CH(NH_2)—CH—(NH_2)C_6H_5$$

diethylene-triamine. Suitable 1.3-diamines are, for instance, trimethylene-diamine, N-ethyl-trimethylene-diamine, N.N'-dimethyltrimethylene-diamine, 1.3-di-(methylamino)-propanol-2

$$CH_3NHCH_2CHOHCH_2NHCH_3$$

2.4-butylene-diamine $$CH_3CH(NH_2)CH_2CH_2NH_2$$

and the like. The amino groups in the 1.2- and 1.3-diamines which come into consideration for the ring formation are but primary or secondary ones; other amino groups which may perhaps be present may also be tertiary, for instance, dimethylaminoethyl-ethylene-diamine $$(CH_3)_2N—C_2H_4NHC_2H_4NH_2$$

The present process is preferably performed by gradually heating at a temperature of about 280° C., while stirring, the mixture of the di- or poly-basic acid and the 1.2- or 1.3-diamine and the hydrochloride thereof, whereby the amine hydrochloride, which at first deposits on the bottom, is dissolved. Reduced pressure is advantageously applied, especially in the second half of the reaction. One mol of the free diamine and of the diamine salt each is preferably used per one mol of the dicarboxylic acid. In order to accelerate the reaction, there may be used an excess of the base or the salt or of both of them, this excess being easily recovered.

By condensing sebacic acid with ethylene-diamine and ethylene-diamine hydrochloride, the dihydrochloride of octamethylene-diimidazoline is obtained according to the following equation:

$CO_2H(CH_2)_8CO_2H + NH_2C_2H_4NH_2 + NH_2C_2H_4NH_2 \cdot 2HCl =$

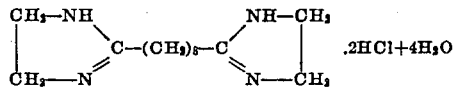
$.2HCl + 4H_2O$

If the ethylene-diamine and its hydrochloride are replaced by trimethylene-diamine and trimethylene-diamine hydrochloride, the dihydrochloride of the octamethylene-ditetrahydropyrimidine having the following formula is obtained in an analogous manner:

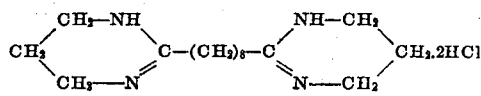

If there is used N.N'-dibenzyl-ethylene-diamine or N.N'-di-ethyltrimethylene-diamine and the respective hydrochlorides, the octamethylene-di-N.N'-dibenzyl-imidazolinium chloride:

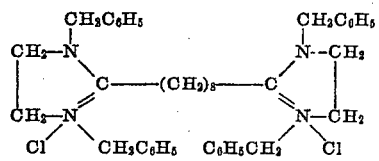

and the octamethylene-di-N:N'-diethyl-tetrahydropyrimidinium chloride

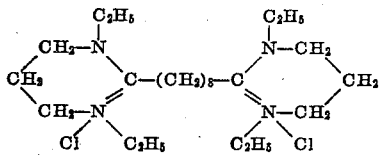

respectively, are obtained.

The quaternary compounds may also be prepared from the tertiary bases by alkylation or aralkylation.

Instead of causing the free acids to react with the mixture of amine and amine salt it is also possible to use the anhydrides, halides and esters of the acids, insofar as they are stable. The esters are in particular suitable in case the free acids or their salts decompose on heating, which is especially the case with malonic acid and its C-alkyl derivatives. When starting from a dicarboxylic acid chloride, the use of the salt of the base may be dispensed with, since the hydrochloric acid set free during the reaction converts part of the base into the hydrochloride.

The same results may also be obtained by heating at an elevated temperature, namely above 200° C., a diacyl derivative of a 1.2- or 1.3-diamine with one of the above-described acids, while adding a salt of the respective diamine with a mineral acid.

Finally, it is also possible to heat at a temperature above 200° C. the mono-acyl derivatives of the said amines and acids, such as they are obtained by heating the acids with a high excess of the amine, in the form of their salts, the salts of the respective di- or poly-imidazolines and di- or poly-tetrahydropyrimidines and of their quaternary derivatives being likewise obtained.

By the reaction of the di- or polybasic acids with the amines there are in general first formed the acyl-amides, which are then by the amine salt, perhaps after previously being split up, transformed into the respective amidine derivatives.

Whereas the formation of the acyl amide is, in the case of mono-basic acids, terminated by the introduction of two acid radicals, the reaction with di- or poly-basic acids is more complicated, since, for instance on heating a dibasic acid $CO_2H—R—CO_2H$ with an approximately equivalent amount of a diamine $NH_2—R'—NH_2$, a complex acid amide

...... NH—CO—R—CO—NH—R'—NH—CO—
R—CO—NH—R'—NH—CO—R—CO .....

is formed the molecular size of which increases with the duration of heating; it can not be foretold whether this acid amide will be split up by the action of the amine salt, a cyclic acid amidine being formed. Surprisingly, these complex acid amides proved to be also capable of being converted in the desired sense, without the temperature being excessively elevated during the action of the amine salt.

If di- or poly-basic acids containing in their molecule labile groups are used, such as hydroxyl groups, the latter may, owing to the elevated temperature, in part by split off during the formation of the amidine.

The di- and poly-imidazolines or tetrahydropyrimidines may, in case they are not substituted in the imino group, be substituted at the nitrogen atom by causing them to react with halogen-alkyl—or aralkyl-halides; the compounds thus obtained, in the form of the free bases, add alkyl halides or aralkyl halides carrying a reactive halogen atom or dialkyl sulfates, the derivatives of the quaternary bases being thus obtained.

The cyclic bases obtained according to the above-described process are, in the form of their salts, in part also in the form of the free bases, readily soluble in water.

The compounds display, especially in the form of their quaternary derivatives, a germicide action and may, therefore, successfully be used for external disinfecting purposes.

In the form of their salts or of their quaternary derivatives obtainable, for instance, by means of chloro-benzyl chloride, the bases are further suitable for moth-proofing wool.

I have, furthermore, found that the fastness of dyeings produced by means of water-soluble dyestuffs, in particular with the so-called substantive dyestuffs are improved when after-treated with the above-described compounds containing in the molecule two or more cyclic acid amidine radicals, such as imidazolines or tetrahydropyrimidines. Instead of the cyclic amidines there may also be used their derivatives, for instance, the corresponding quaternary ammonium compounds. The shade and the fastness to light of the dyeings after-treated with the above products are scarcely changed. The products possess, at the same time, a good fixing power with respect to the dyestuff particles, so that a good fastness to water is obtained.

The following examples serve to illustrate the invention, but they are not intended to limit it thereto; the parts are by weight:

1.

| | Parts |
|---|---|
| Beta-methyl-adipic acid | 160 |
| Ethylene-diamine hydrate | 200 |
| Ethylene-diamine dihydrochloride | 140 | are mixed and then cautiously heated in the air bath. At about 120° C.–130° C., a clear distillate consisting of water and the excess of ethylene-diamine begins to pass over. The temperature is then slowly raised, within the course of 1½–2 hours, at 180° C.–200° C., and the reaction mixture is finally heated, for about 30 minutes, at 260° C.–280° C. under reduced pressure.

A completely clear, honey-yellow liquid is obtained which on cooling solidifies to form a brittle resin. The product dissolves very readily in water to a completely clear liquid; it is the dihydrochloride of the methyl-tetramethylene-diimidazoline.

A dyeing produced on cotton or rayon by means of 3% of Sirius Light Blue F3GL is treated, for half an hour, at a temperature of 20° C.–30° C. with a solution of 1 gram of the product thus obtained. The dyeing by this treatment becomes fast to water, without the shade being changed. The fastness to light is, in contradistinction to most of the hitherto known after-treating agents for improving the fastness to water of substantive dyeings, not unfavorably influenced.

In a similar way, other dyeings, for instance dyeings produced with Brilliant Benzo Fast Violet BL, Brilliant Benzo Green B, Sirius Light Orange GG, Sirius Light Violet BL, Delta Purpurine 5B, Sirius Light Red Violet BL, Sirius Light Green BB, Sirius Light Blue G, Sirius Light Red 5B, Rayon Black G and others may be rendered fast to water, without the shade or the fastness to light being unfavorably influenced.

Instead of the above-named after-treating agent, there may also be used the dihydrochloride of the octamethylene-diimidazoline.

2.

| | Parts |
|---|---|
| Malonic acid diethyl ester | 200 |
| Ethylene-diamine hydrate | 200 |
| Ethylene-diamine dihydrochloride | 180 | are cautiously heated as described in Example 1. At about 80° C.–100° C., the ethyl alcohol is set free and distils. The temperature is then raised, so as to reach, within 1½ hours, 180° C.–200° C. The whole is finally heated, under reduced pressure, at 260° C.–280° C. A light-yellow, completely clear melt is obtained which very readily dissolves in water.

3.

| | Parts |
|---|---|
| Succinic acid methyl ester | 300 |
| Ethylene-diamine hydrate | 400 |
| Ethylene-diamine dihydrobromide | 220 | are heated as described in Example 2. The methyl alcohol distils first, then the water and the excess of ethylene-diamine.

After heating the reaction mixture at 280° C.—if desired under reduced pressure—a light-yellow, clear product is obtained which easily dissolves in water.

4.

| | Parts |
|---|---|
| Sebacic acid | 200 |
| Ethylene-diamine hydrate | 200 |
| Ethylene-diamine hydrochloride | 140 | are condensed, exactly as described in Example 1, finally under reduced pressure. A honey-yellow, clear melt is obtained which solidifies to a solid resinous mass. It dissolves in water to a clear solution. The aqueous solution yields on shaking an unstable foam.

The condensation product (octamethylene-diimidazoline) thus obtained which is first present in the form of its hydrochloride, is dissolved in water. There is preferably prepared a solution of about 10 per cent. strength in water. A caustic potash solution of 30 per cent. strength is added thereto in the cold, whereby the base is precipitated; it is immediately shaken out with ether. After evaporation of the ether, the base is obtained in the dry state. It is then heated, for 2–3 hours, at about 150° C.–160° C. with an equimolecular amount of ortho-chlorobenzyl chloride. A brownish completely clear product is obtained; it is dissolved in water so that a solution of 10 per cent. strength is formed. Concentrated ammonia is added to this solution and the free base is quickly shaken out with benzene. The benzene is removed, in known manner, after drying, and the residual base, which is chlorobenzylated at the imide nitrogen atom, is quaternated, by means of an excess of about 10 per cent. of chlorobenzyl chloride, by heating at 160° C., for 2–3 hours. A brownish mass is formed which completely dissolves in water.

Solutions of 1 per cent. strength of the product thus obtained constitute, owing to their antibacterial and germicide action, a very good disinfectant. They are, in this respect, much superior to ordinary phenol soap mixtures.

The product prepared in the above-indicated manner may also be used, with advantage, for moth-proofing woollen materials (wool felt, carpets, hosiery and the like). The woollen material is impregnated with a solution containing per liter 5–20 grams of the agent and dried as usual. The woollen material thus treated is moth proof.

5.

| | Parts |
|---|---|
| Tartaric acid | 100 |
| N-methyl-ethylene-diamine | 100 |
| N-methyl-ethylene-diamine dihydrochloride | 100 | are condensed as described in Example 1. A thinly liquid melt having a rather dark coloration is obtained; it dissolves in water to a completely clear solution.

6.

| | Parts |
|---|---|
| Aconitic acid | 174 |
| Isopropyl-ethylene-diamine | 300 |
| Isopropyl-ethylene-diamine dihydrobromide | 400 | are condensed, as above indicated, by heating at about 280° C. A dark material is obtained which easily dissolves in water.

7.

| | Parts |
|---|---|
| Citric acid | 200 |
| N.N'-dibenzylethylene-diamine | 550 |
| N.N'-dibenzylethylene-diamine dihydrofluoride | 390 | are condensed as described in Example 1. A very dark product is obtained which dissolves in water to a clear solution.

8.

| | Parts |
|---|---|
| Terephthalic acid | 250 |
| 1.2-propylene-diamine | 250 |
| Propylene-diamine dihydrochloride | 220 | are condensed as above indicated by heating at 280° C., perhaps under reduced pressure. A product is obtained which dissolves in water to a clear solution.

9.

| | Parts |
|---|---|
| Diglycolic acid | 100 |
| Trimethylene-diamine | 100 |
| Trimethylene-diamine dihydrochloride | 110 | are condensed as above indicated at a temperature of 280° C., perhaps under reduced pressure. A rather light product is obtained which easily dissolves in water to a clear solution.

Instead of the 100 parts of diglycolic acid there may be used for the same operation 110 parts of thiodiglycolic acid. The condensation to the corresponding thio-derivative occurs in the same manner as with the diglycolic acid.

10.

| | Parts |
|---|---|
| Mucic acid | 100 |
| N.N'-dibenzyl-trimethylene-diamine | 380 |
| N.N'-dibenzyltrimethylene-diamine dihydrochloride | 330 | are condensed, as above indicated, to the corresponding quaternary derivative. A rather dark product is obtained which easily dissolves in water.

11.

| | Parts |
|---|---|
| Camphoric acid | 50 |
| 2.4-propylene-diamine | 40 |
| 2.4-propylene-diamine dihydrobromide | 63 | are condensed, as described in Example 1, at an elevated temperature, the temperature being raised, within two hours, at about 260° C.-280° C. The rather dark material thus obtained dissolves in water to a completely clear solution.

12.

| | Grams |
|---|---|
| Adipic acid | 22 |
| Ethylene-diamine hydrate | 18 |
| Ethylene-diamine hydrochloride | 22 |

The above-indicated quantities are gradually heated in a fractionating flask having a capacity of 150 cc. and provided with a thermometer reaching unto the bottom. At about 130° C.-140° C., the hydrochloride dissolves in the liquid formed. The water and the excess of ethylene-diamine hydrate distill, while slightly foaming. The temperature is then raised, within half an hour, at about 200° C., and this temperature is maintained for about 10-15 minutes. It is, thereupon, raised, within half an hour, at 280° C. The melt, which was light-yellow until then, begins to darken. The reaction mixture is still heated for 10 minutes, the temperature being maintained, for about half of the time, at 290° C.-295° C. The melt is dark-orange; while hot, it is stirred with about 80 grams of hot alcohol of 96 per cent strength and boiled, for half an hour, under reflux, until all the matter soluble in alcohol has dissolved; it is then filtered, while hot, and the residue thoroughly washed, twice or thrice, with 8 cc. of hot alcohol each time. The residue (4.8 grams) which is insoluble in alcohol consists, for the main part, of ethylene-diamine hydrochloride. The combined filtrates are treated with decolorizing coal, filtered and concentrated to about 60 grams. On cooling, the whole solidifies to a crystalline magma, which is sharply filtered with suction and washed, three or four times, with 5 cc. of alcohol each time. About 19 grams of a crystalline dust moist with alcohol of tetramethylene-diimidazoline hydrochloride are thus obtained.

100 grams of absolute alcohol are poured upon the reaction product and the whole is boiled until dissolution has occurred, it is then filtered in order to eliminate a small amount (about 0.5 gram) of ethylene-diamine hydrochloride, again treated with some coal and the filtrate is finally concentrated to 25 grams. On cooling, a crystalline magma is formed which is filtered with suction and washed several times with some alcohol. A white crystalline mass of pure tetramethylene-diimidazoline hydrochloride is obtained.

The determination of the chlorine and nitrogen content showed that the product obtained is pure tetramethylene-diimidazoline hydrochloride:

N found = 21.21%
N calculated = 20.97%
Cl found = 27.23%
Cl calculated = 26.6%

From the mother liquors, especially from those of the first crystallization, considerable amounts of pure tetramethylene-diimidazoline hydrochloride may still be obtained. The analysis of the crystals obtained from the mother liquors yielded the following numbers:

N found = 20.73%
N calculated = 20.97%
Cl found = 26.1%
Cl calculated = 26.6%

2 grams of pure tetramethylene-diimidazoline hydrochloride are dissolved, while gently heating, in 100 grams of absolute alcohol, and the whole is then allowed to cool completely. A solution of sodium in absolute alcohol is meantime prepared and the content of sodium ethylate is determined. Such an amount of the solution of sodium ethylate in absolute alcohol is, thereupon, added, in the cold, to the solution of the tetramethylene-diimidazoline hydrochloride in absolute alcohol as stoichiometrically corresponds with the amount of chlorine analytically determined. Sodium chloride is immediately precipitated. The whole is allowed to stand overnight and then filtered with exclusion of moistness (best in an exsiccator); the alcohol is then evaporated, under reduced pressure, at a possibly low temperature. The yellow-white residue obtained may be recrystallized from a small amount of alcohol, care being taken that any moistness is excluded. From the analysis results:

N found = 29.3%
N calculated = 28.85%

I claim:

1. Process for the manufacture of compounds containing at least two cyclic amidine radicals which comprises causing a compound selected from the group consisting of carboxylic acids containing at least two carboxylic acid groups and anhydrides, halides and esters thereof to react with a mixture of a nitrogen base of the group consisting of aliphatic and cycloaliphatic 1.2-diamines and 1.3-diamines, and N-mono-substitution and N.N'-disubstitution products thereof, and of a salt of such a base with a strong acid, the reaction being carried out at a high temperature.

2. Process for the manufacture of compounds containing at least two cyclic amidine radicals which comprises causing one mol of a compound selected from the group consisting of carboxylic acids containing at least two carboxylic acid groups and anhydrides, halides and esters thereof to react with at least one mol of a nitrogen base of the group consisting of aliphatic and cycloaliphatic 1.2-diamines and 1.3-diamines, and N-mono-substitution and N.N'-disubstitution products thereof and with at least one mol of a salt of such a base with a strong acid, the reaction being carried out at a high temperature.

3. Process for the manufacture of compounds containing at least two cyclic amidine radicals which comprises causing one mol of a compound selected from the group consisting of carboxylic acids containing at least two carboxylic acid groups and anhydrides, halides and esters thereof to react with at least one mol of a nitrogen base of the group consisting of aliphatic and cycloaliphatic 1.2-diamines and 1.3-diamines, each diamine containing at least one primary but no tertiary amino group, and with at least one mol of a salt of such a base with a strong acid, the reaction being carried out at a high temperature.

4. Process for the manufacture of compounds containing at least two cyclic amidine radicals which comprises causing one mol of a compound selected from the group consisting of carboxylic acids containing at least two carboxylic acid groups and anhydrides, halides and esters thereof to react with at least one mol of ethylene diamine and at least one mol of a salt of ethylene diamine with a strong acid, the reaction being carried out at a high temperature.

5. Process for the manufacture of compounds containing at least two cyclic amidine radicals which comprises causing one mol of a compound selected from the group consisting of carboxylic acids containing at least two carboxylic acid groups and anhydrides, halides and esters thereof to react with at least one mol of ethylene diamine and at least one mol of ethylene diamine hydrochloride, the reaction being carried out at a high temperature.

6. Process for the manufacture of compounds containing at least two cyclic amidine radicals which comprises causing one mol of a compound selected from the group consisting of carboxylic acids containing at least two carboxylic acid groups and anhydrides, halides and esters thereof to react with at least one mol of a nitrogen base of the group consisting of aliphatic and cycloaliphatic 1.2-diamines and 1.3-diamines, each diamine containing at least one primary but no tertiary amino group, and with at least one mol of a salt of such a base with a strong acid, the reaction being carried out at a high temperature and causing the reaction product thus obtained to react with a member of the group consisting of alkylating and aralkylating agents.

7. Process for the manufacture of compounds containing at least two cyclic amidine radicals which comprises causing one mol of a compound selected from the group consisting of carboxylic acids containing at least two carboxylic acid groups and anhydrides, halides and esters thereof to react with at least one mol of a nitrogen base of the group consisting of aliphatic and cycloaliphatic 1.2-diamines and 1.3-diamines, each diamine containing at least one primary but no tertiary amino group, and with at least one mol of a salt of such a base with a strong acid, the reaction being carried out at a high temperature, and causing the reaction product thus obtained to react with ortho-chlorobenzyl chloride.

8. Process for the manufacture of compounds containing at least two cyclic amidine radicals which comprises causing one mol of adipic acid to react with at least one mol of ethylene-diamine and one mol of ethylene-diamine hydrochloride, the reaction being carried out at a high temperature.

9. Process for the manufacture of compounds containing at least two cyclic amidine radicals which comprises causing one mol of beta-methyladipic acid to react with at least one mol of ethylene-diamine and one mol of ethylene-diamine hydrochloride, the reaction being carried out at a high temperature.

10. Process for the manufacture of compounds containing at least two cyclic amidine radicals which comprises causing one mol of sebacic acid which comprises causing one mol of ethylene diamine to react with at least one mol of ethylene diamine and one mol of ethylene-diamine hydrochloride, the reaction being carried out at a high temperature.

11. The products of the general formula:

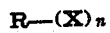

wherein R stands for an organic radical and X means a radical selected from the group consisting of radicals comprising the amidazoline ring system and the tetrahydropyrimidine ring system and the tetrahydropyrimidine ring system substituted by a hydroxy group, the radical R being bound to the µ-position of the cyclic radicals, and n is an integer higher than 1 and whereby every product contains X radicals belonging to only one of the said systems.

12. The products of the general formula:

wherein R stands for a hydrocarbon radical and X means the imidazoline radical, R being bound to the µ-position of both imidazoline radicals.

13. The products of the general formula:

wherein R stands for a hydrocarbon radical and X means the imidazolinium ring system, R being bound to the µ-position of both imidazolinium ring systems.

14. The products of the general formula:

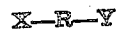

wherein R stands for a hydrocarbon radical and X and Y stand for members of the group consisting of

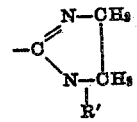

and

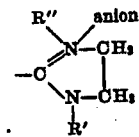

R' and R" being alkyl and aralkyl radicals.

15. The products of the general formula:

wherein R stands for an aliphatic hydrocarbon radical and X and Y stand for members of the group consisting of

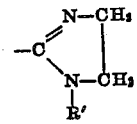

and
R' and R'' being alkyl and aralkyl radicals.
16. The product of the formula:
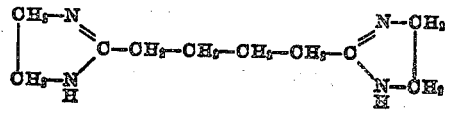
17. The product of the formula:
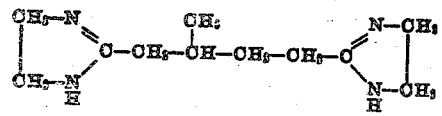
18. The product of the formula:
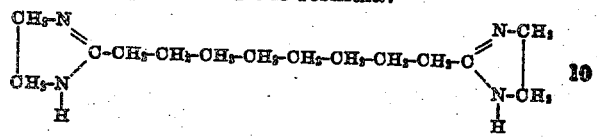
AUGUST CHWALA.